United States Patent [19]

Inamoto

[11] 4,168,858

[45] Sep. 25, 1979

[54] MOTOR VEHICLE WINDOW ASSEMBLY WITH AN IMPROVED MOULDING STRIP CLIPPING MEMBER

[75] Inventor: Hiroshi Inamoto, Yokohama, Japan

[73] Assignee: Nissan Motor Company, Limited, Yokohama, Japan

[21] Appl. No.: 798,619

[22] Filed: May 19, 1977

[30] Foreign Application Priority Data

May 19, 1976 [JP] Japan ............................. 51-63896[U]

[51] Int. Cl.² ............................................ B60J 1/02
[52] U.S. Cl. ................................... 296/84 R; 52/718; 296/84 A; 296/84 D
[58] Field of Search .............. 296/84 R, 84 A, 84 D; 52/208, 718

[56] References Cited

U.S. PATENT DOCUMENTS 3,155,204  11/1964  Campbell et al. ...................... 52/208

*Primary Examiner*—Robert R. Song
*Attorney, Agent, or Firm*—Schwartz, Jeffery, Schwaab, Mack, Blumenthal & Koch

[57] ABSTRACT

A spring clip having a protruded branch is bonded to a frame such that the branch is faced to an edge of a fixed window glass panel. When a decorative moulding strip is hooked to the clip member to cover the unsightly parts of the window assembly, a portion of the branch is urged to engage with the edge of the glass panel for thereby urging the clip member into firm contact with the frame structure. With this, the undesirable phenomenon of the clip being torn from the frame during the engagement of the moulding strip with the clip is eliminated.

25 Claims, 31 Drawing Figures

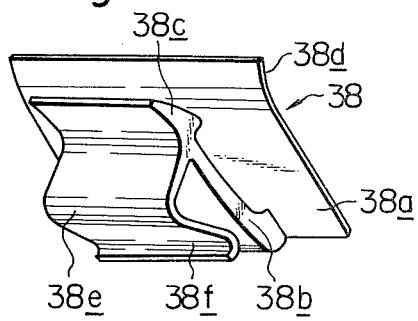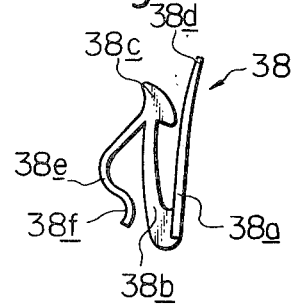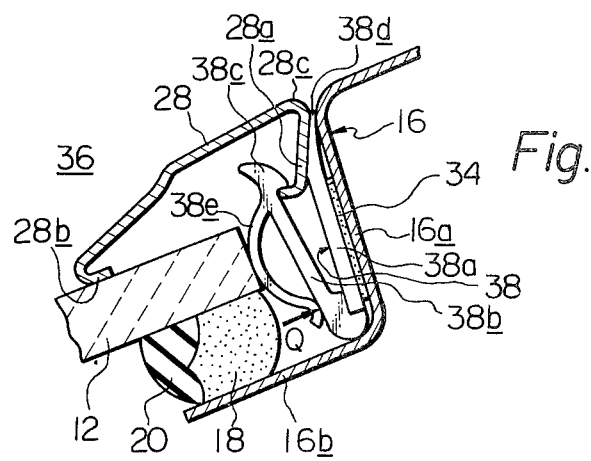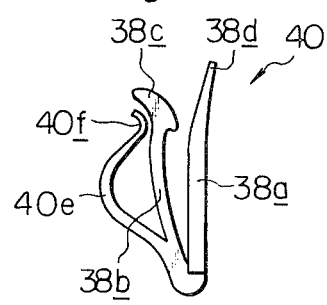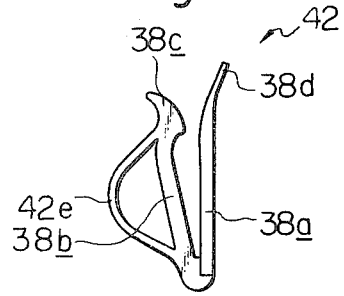

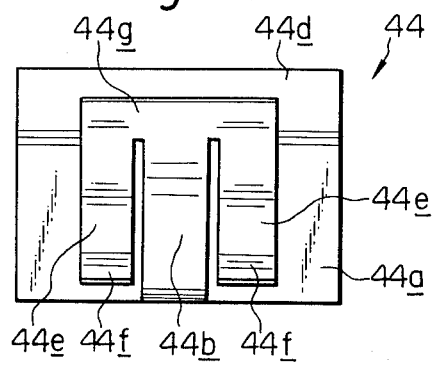 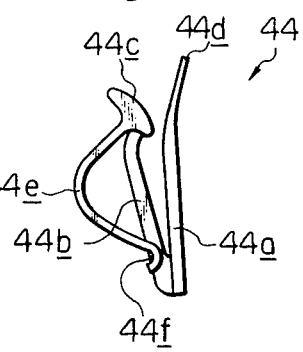 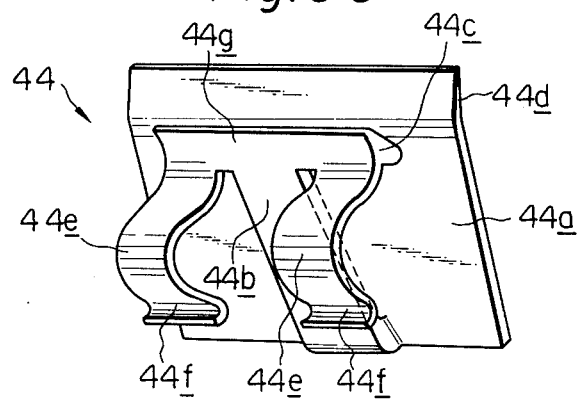 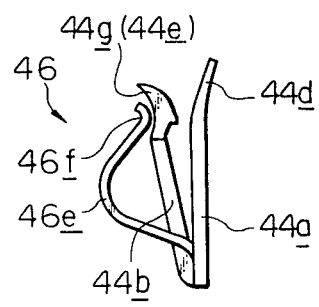 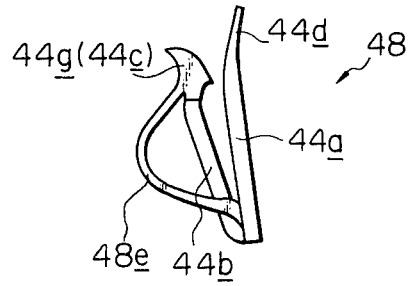

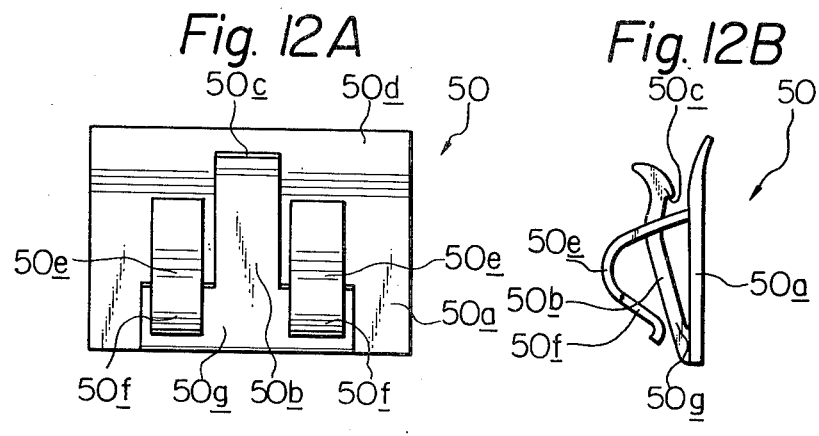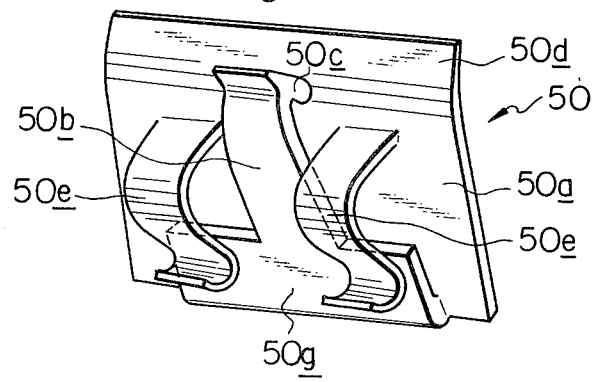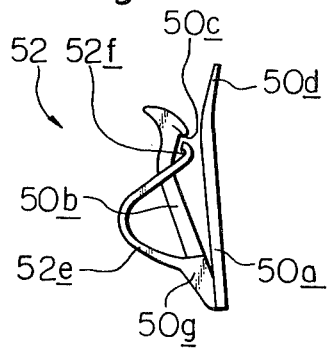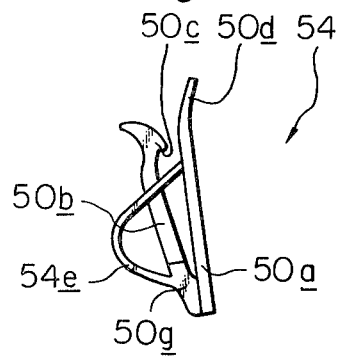

MOTOR VEHICLE WINDOW ASSEMBLY WITH AN IMPROVED MOULDING STRIP CLIPPING MEMBER

BACKGROUND OF THE INVENTION

The present invention relates to a motor vehicle window assembly in which a decorative moulding strip is fixed by a suitable number of spring clips to the windshield frame structure formed in the vehicle body for decorating the marginal area of the windshield or glass panel.

It is an object of the present invention to provide a motor vehicle window assembly in which a removable decorative moulding strip is securely fixable to the assembly.

It is another object of the present invention to provide a motor vehicle window assembly in which the securing of the moulding strip to the assembly is reliably achieved by using suitable numbers of spring clips which are bonded to the frame structure and have improved constructions or configurations.

It is still another object of the present invention to provide a motor vehicle window-assembly which has an improved spring clip having an protruded branch portion which functions to urge the clip into firm contact with the frame structure when the moulding strip is brought into engagement with the spring clip, thereby preventing the spring clip from being removed from the frame structure during the engagement of the moulding strip with the spring clip.

SUMMARY OF THE INVENTION

According to the present invention, there is provided a motor vehicle window assembly comprising a fixed glass panel, a frame structure having a surface portion defining an aperture in which the glass panel is received, the surface portion being spaced from an edge of the glass panel at a predetermined distance; a clip member interposed between the edge of the glass panel and the surface portion and including a base bonded to the surface portion and a leg extending away from a portion of the base towards the outside or exterior of the vehicle to form a catch portion at the leading end thereof; means engageable with the edge of the glass panel for urging the base into firm contact with the surface portion when the leg is urged away from the base; and a moulding strip having one edge engageable with the catch portion to urge the leg away from the base.

Other objects and advantages of the present invention will become apparent from the following detailed description when taken in conjunction with the accompanying drawings.

BRIEF DESCRIPTION OF THE DRAWINGS

In the drawings:

FIGS. 5A and 5B are respective perspective and side views of an improved clip member which is employable in a window assembly according to the present invention;

FIG. 6 is an enlarged sectional view of the window assembly of the invention, as being equipped with the clip member shown in FIGS. 5A and 5B;

FIGS. 7 and 8 are respective side views of other improved clip members each having similar construction to the clip member shown in FIGS. 5A to 5C;

FIGS. 9A to 9C are respective front, side and perspective views of another improved clip member employable in the assembly of the invention;

FIGS. 10 and 11 are respective side views of other improved clip members each having similar construction to the clip member shown in FIGS. 9A to 9C;

FIGS. 12A to 12C are respective front, side and perspective views of another improved clip member employable in the assembly of the invention;

FIGS. 13 and 14 are respective side views of other improved clip members each having similar construction to the clip member shown in FIGS. 12A to 12C;

DETAILED DESCRIPTION OF PREFERRED EMBODIMENTS

Figure 1:
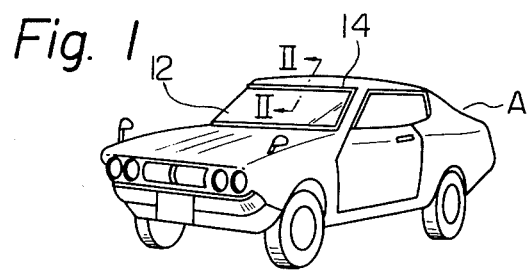
FIG. 1 is a sketch of a motor vehicle having a window assembly to which the present invention is applicable.
Figure 2:
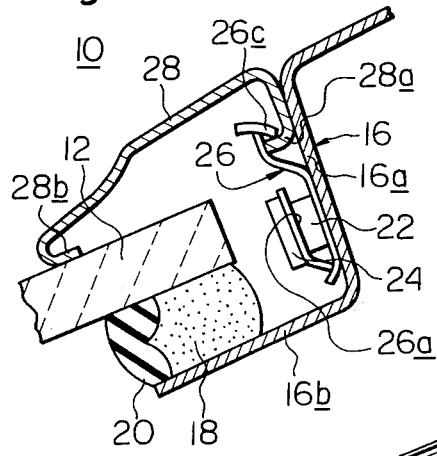
FIG. 2 is an enlarged sectional view of a prior art window assembly, the view being taken along the line II—II of FIG. 1.
Figure 3:
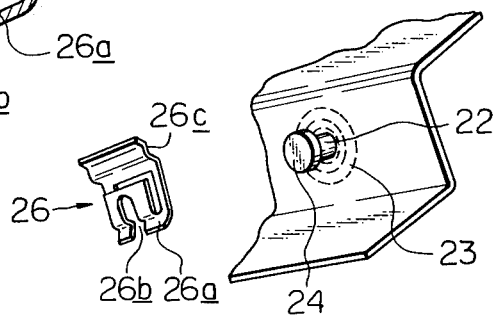
FIG. 3 is a perspective view of parts shown in FIG. 2.

Referring to FIGS. 1 to 3, particularly to FIG. 2, there is shown a first prior art window assembly which is generally designated by the reference numeral 10. The view of FIG. 2 is taken along the line II—II of FIG. 1 in which a motor vehicle "A" is shown as including a windshield or glass panel 12 and a decorative moulding strip 28. As seen in FIG. 2, the window assembly 10 generally comprises the glass panel 12, a frame structure 16 having a first flat surface 16a and a second flat surface 16b which are substantially perpendicular to each other. The glass panel 12 is bonded at its marginal area to the second flat surface 16b via an adhesive 18 so that the edge of the glass panel 12 is vertically spaced apart from the first flat surface 16a by a predetermined distance and the face of the panel 12 is substantially parallel with the second flat surface 16b, as shown. A sealing member such as a rubber strip 20 is disposed between the glass panel 12 and the leading end of the second flat surface 16b for stopping the downward flowing of the adhesive 18 in the fluid state. Firmly welded to the first flat surface 16a are numbers of spaced stud members 22 (only one in shown) each of which is formed at the projecting end thereof with an enlarged head 24. A spring clip 26 made of metal or plastic is in resilient engagement with each of the stud members 22 via a U-shaped spring portion 26a thereof formed with a cut out 26b through which the stud member 22 is passed. The upper end of the spring clip 26 is formed with a catch portion 26c with which a bent end 28a of a decorative moulding strip 28 is engaged, as shown in FIG. 2. The moulding strip 28 has the other bent end 28b engaging with a marginal area (no numeral) of the outer face of the glass panel 12 so as to conceal the unsightly portion of the assembly 10, as shown.

With the construction of the first prior art window assembly 10, however, there may arise several problems as follows. Since the stud member 22 is connected to the frame structure 16 via welding, great numbers of spattered molten metal particles are deposited on a portion 23 of the frame structure 16 near the stud member 22 thereby making it very difficult to adequately paint the particle covered portion. Furthermore, even if the painting of the particle covered portion is achieved satisfactorily, the paint on the portion may be easily chipped or worn off during the setting of the spring clip member 26 to the stud member 22 since the surface of the subject portion is rough because of the deposition of the molten particles. These will permit undesirable rusting at the subject portion.

Figure 4:
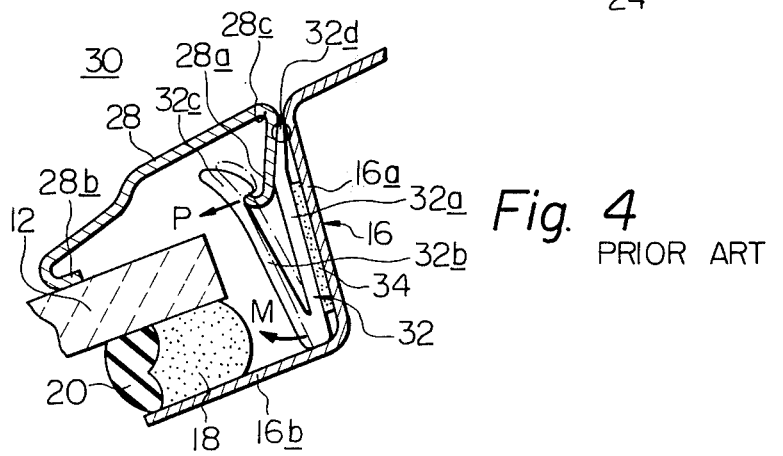
FIG. 4 is a similar view to FIG. 2, but showing another prior art window assembly.

FIG. 4 shows a second prior art motor vehicle window assembly 30 which can solve the problems encountered in the above-mentioned window assembly 10. As shown in the drawing, the assembly 30 comprises generally the same parts as the assembly 10 shown in FIG. 2. Thus, the same parts will be designated by the same reference numerals as in the case of FIG. 2. The assembly 30 contains therein a spring clip member 32 made of resilient plastic which includes a base 32a bonded to the first flat surface 16a via a conventional adhesive or adhesive member such as dual-sided adhesive tape 34, and a resilient leg 32b outwardly extending from a lower section of the base 32a to form a catch portion 32c at the leading end thereof, as shown. The base 32a is formed so as to be relatively thin at its upper portion as seen in the drawings. The adhesive connection of the spring clip 32 to the first flat surface 16a is made after the subject portion 16a has been painted.

With this construction and assembling procedure, the before-mentioned problems in connection with the undesirable rusting are eliminated. However, in such an assembly 30, there will arise a new problem. When the decorative moulding strip 28 is brought into engagement with the clip member 32, a shoulder portion 28c of the strip 28 flexes the upper thin end 32d of the base 32a of the clip member 32 to the right in this drawing to engage the thin end 32d with a curved edge portion of the first flat surface 16a. Thus, the base 32a is caused to be subjected to a moment (M) to rotate same clockwise using the adhesive tape 34 as a fulcrum. In addition to this phenomenon, the flexing of the resilient leg 32b away from the base 32a due to force (P) exerted by the bent end 28a will increase the moment (M). Thus, the clip member 32 is sometimes torn off from the first flat surface 16a during the engaging of the moulding strip 28 with the clip member 32.

Thus, as mentioned before, the present invention proposes an improved motor vehicle window assembly which can eliminate the above-mentioned several drawbacks encountered in the conventional window assemblies 10 and 30.

Referring to FIGS. 5A, 5B and 6, particularly to FIG. 6, there is illustrated an improved window assembly according to the present invention, generally designated by the numeral 36. Since the assembly 36 comprises generally the same parts as in the before-described prior art shown in FIG. 2, a detailed explanation of same will be omitted from the following description. According to the present invention, a characteristic spring clip member 38 is employed as a substitute for the clip member 32 of FIG. 2. The clip member 38 is made of some resilient material and comprises a flat base 38a which is to be bonded to the first flat surface 16a of the frame structure 16 via the adhesive member 34. As best seen in FIG. 5A, an upper section 38d of the base 38 is bent slightly so as to be at an angle with respect to the major portion of the base and formed so as to be relatively thin. The thin section 38d is prepared to prevent the upper section of the first flat surface 16a from being directly engaged with the shoulder portion 28c of the moulding strip 28 upon engagement therebetween. Extending upwardly (as seen in the drawings) from a lower section of the base 38a is resilient leg 38b which has at its leading or free end a catch portion 38c engageable with the bent end 28a of the decorative moulding strip 28. Extending downwardly from the catch portion 38a is an outwardly protruded branch 38e which is formed at its leading or lower end with a curled portion 38f normally spaced from the lower section of the leg portion 38b as well shown in FIG. 5B. Preferably, the clip member 38 is made of a resilient plastic material and has a mono-block construction.

The manner of assembly is as follows.

Each of the clip members 38 is fixed at its base 38a to the first flat surface 16a of the frame structure 16 through the adhesive member 34 in such an arrangement that the catch portion 38c faces toward the exterior of the vehicle (that is, upwardly in FIG. 6) and the upper thin section 38d is located near the curved section of the first flat surface 16a. Then, the glass panel 12 which has had its marginal area coated with the partially cured adhesive 18 and the rubber strip 20 is bonded to the second flat surface 16b through the adhesive 18 such that the edge of the glass panel 12 is faced to the branch 38e of the fixed clip member 38. After the complete curing of adhesive 18, the decorative strip 28, more particularly, the bent end 28a of the same is engaged with the catch portion 38c to be locked in place so that the unsightly parts are concealed by the decorative strip 28. Upon engagement of the bent end 28a with the catch portion 38c, the following will occur. The leftward flexing of the resilient leg 38b due to the insertion of the bent end 28a of the decorative strip 28 causes the protruded branch 38e to be firmly engaged with the edge of the glass panel 12, so that the branch 38e is depressed to make the curled portion 38f thereof contact and urge the integral or connected section of the leg 38b, with a certain force ($\Omega$), toward the first flat surface 16a of the frame structure 16. With this, the connection between the clip member 38 and the first flat surface 16a is intensified thereby preventing the before-mentioned undesirable tear off phenomenon of the clip member encountered in the prior art during the assemblage thereof. It will be appreciated from the above that the magnitude of the urging force ($\Omega$) critically depends upon the leftward movement made by the leg 38b.

FIGS. 7 and 8 show respectively other clip members 40 and 42 each having a similar construction to the above-mentioned member 38. Thus, in these figures (FIGS. 7 and 8), the same parts are designated by the same reference numerals as in the case of FIG. 5B. The clip member 40 shown in FIG. 7 is constructed to have an outwardly protruded branch 40e which has a lower end integral with the lower section of the leg 38b and an upper end formed with a curled portion 40f. The curled portion 40f is spaced from the catch portion 38c by a predetermined distance in an inoperative condition of the clip member 40, shown in the drawing. On the contrary, the clip member 42 of FIG. 8 has an outwardly protruded branch 42e which is integral at both ends with the lower section of the leg 38b and the catch portion 38c. Of course, the clip members 40 and 42 operate in generally same manner as in the case of the before-mentioned clip member 38.

FIGS. 9A to 9C show another exemplary clip member 44 having a characteristic configuration. As best seen in FIG. 9C, the clip member 44 comprises a flat base 44a which is to be bonded to the first flat surface 16a of the frame structure 16 through the adhesive member 34 in generally the same manner as shown in FIG. 6. Also in this example, the upper section 44d of the base 44a is formed relatively thin for the same reason described before. Upwardly extending from a lower section of the base 44a is an integral resilient leg 44b which has at its upper section a laterally extending arm 44g formed with a catch portion 44c which is engageable with the before-mentioned bent end 28a of the decorative moulding strip 28. Downwardly and respectively extending from the two lateral sides of the arm 44g are two outwardly protruded branches 44e each having at its leading end a curled portion 44f. As is well seen in FIG. 9B, the curled portion 44f is spaced from a surface of the flat base 44a at a certain distance.

FIGS. 10 and 11 show respectively other clip members 46 and 48 each of which has a similar construction or configuration to the above-stated clip member 44 shown in FIGS. 9A to 9C. Thus, for facilitation in these figures (FIGS. 10 and 11), the same parts will be designated by the same numerals as in the case of FIG. 9B. The clip member 46 shown in FIG. 10 is constructed to have outwardly protruded branches 46e each of which extends upwardly from a lower section of the flat base 44a and has a leading or upper end a curled portion 46f located near the corresponding side of the laterally extending arm 44g. The both curled portions 46f are spaced from the outside surface of the arm by a certain distance. On the contrary, the clip member 48 of FIG. 11 is constructed to have outwardly protruded branches 48e each of which is integral at both ends with the lower section of the flat base 44a and the corresponding side of the laterally extending arm 44g.

FIGS. 12A, 12B and 12C show another exemplary clip member 50 which also has a characteristic configuration. As best seen in FIG. 12C, the clip member 50 comprises a flat base 50a which is to be fixed to the first flat surface 16a of the frame structure 16 through the adhesive member 34 in the before-described manner. The upper section 50d of the base 50a is slightly bent and relatively thin. Extending upwardly from a lower section of the base portion 50a is a laterally extending wall 50g which has at its generally middle section an upwardly extending resilient leg 50b. The leading end of the leg 50b is formed with a catch portion 50c which is engageable with the before-described bent end 28a of the decorative moulding strip 28. Downwardly and respectively extending from relatively upper sections of the base portion 50a while flanking the leg portion 50b therebetween are two outwardly protruded branches 50e each having at its leading or lower end a curled portion 50f located near the corresponding one side of the wall 50g. As is well seen in FIGS. 12B and 12C, the curled portions 50f are spaced from the outside surface of the wall 50g by a certain distance.

FIGS. 13 and 14 show respectively other clip members 52 and 54 each having a similar construction or configuration to the above-mentioned clip member 50 illustrated in FIGS. 12A to 12C. Thus, for facilitation, the same parts in these figures (FIGS. 13 and 14) are designated by the same numerals as in the case of FIG. 12B. The clip member 52 shown in FIG. 13 is constructed to have two outwardly protruded branches 52e each of which extends from the corresponding each side of the wall 50a and has on a leading or upper end a curled portion 52f spaced apart by a certain distance from the corresponding surface of the base 50a. On the contrary, the clip member 54 of FIG. 14 is constructed to have two outwardly protruded branches 54e each of which is integral at both ends with the corresponding sides of the wall portion 50g and the corresponding upper section of the base 50a.

Figure 15A:
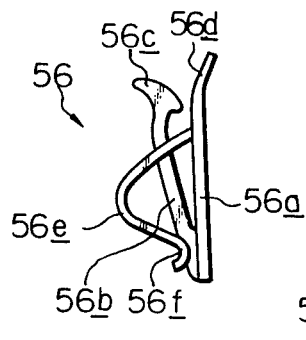
FIGS. 15A and 15B are respective side and perspective views of another improved clip member employable in the assembly according to the present invention.
Figure 15B:
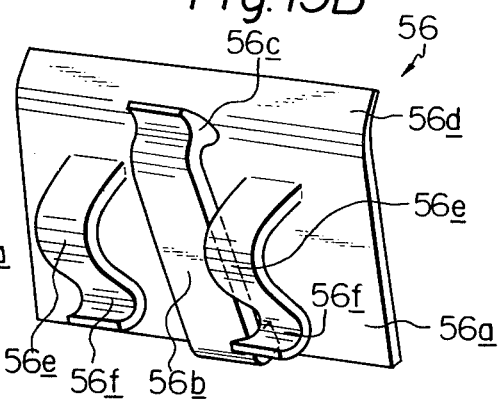

FIGS. 15A and 15B show another exemplary clip member 56 which comprises, as best seen in FIG. 15B, a flat base 56a which is adapted to be fixed to the first flat surface 16a of the frame structure 16 through the adhesive member 34. The upper section 56d of the base 56a is slightly bent and relatively thin. Extending upwardly from a lower section of the base 56a is a resilient leg 56b which has at its leading or upper end a catch portion 56c which is engageable with the before-described bent end 28a of the decorative moulding strip 28. Downwardly extending from relatively upper sections of the base 56a while flanking the leg 56b therebetween are two outwardly protruded branches 56e each having at its leading or lower end a curled portion 56f located near the corresponding lower section of the base 56a. As is well shown in FIG. 15A, the curled portions 56f are spaced from the outside surfaces of the corresponding lower sections of the base 56a.

Figure 16:
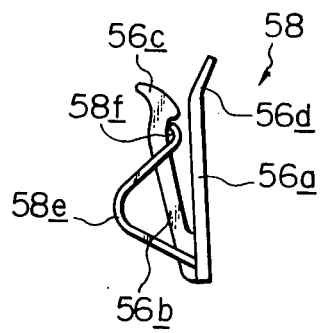
FIGS. 16 and 17 are respective side views of other improved clip members each having similar construction to the clip member shown in FIGS. 15A and 15B.
Figure 17:
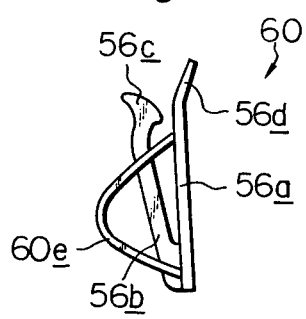

FIGS. 16 and 17 show respectively other clip members 58 and 60 each of which is similar in construction or configuration to the clip member 56 described above. Thus, for facilitation, the same parts in these figures (FIGS. 16 and 17) will be designated by the same numerals as in the case of FIG. 15A. The clip member 58 shown in FIG. 16 has two outwardly protruded branches 58e which extend from the corresponding lower sections of the base 56a and have at their leading or upper ends curled portions 58f spaced apart at a certain distance from the upper sections of the base portion 56a. In the case of FIG. 17, the clip member 60 has two outwardly protruded branches 60e each of which is integral at both ends with the lower and upper sections of the base 56a.

Figure 18A:
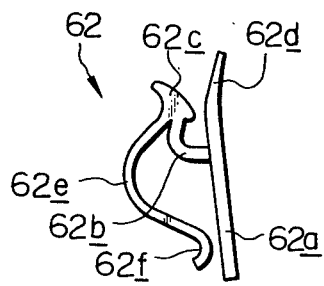
FIGS. 18A and 18B are respective side and perspective views of another improved clip member employable in the window assembly of the invention.
Figure 18B:
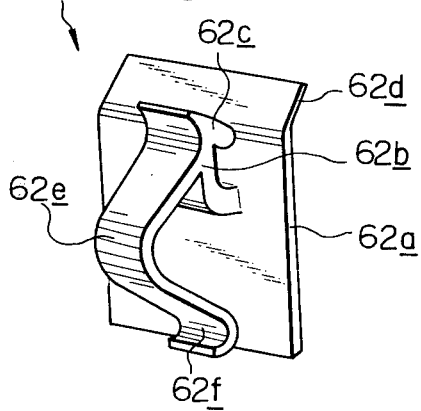

FIGS. 18A and 18B show another exemplary clip member 62 comprising a flat base 62a to be fixed to the frame structure 16 in the same manner as described above. Upwardly extending from a relatively upper section of the base 62a is a resilient leg 62b which is formed at its leading or upper end with a catch portion 62c engageable with the decorative moulding strip 28. Extending downwardly from the leg 62b at the catch portion 62c is an outwardly protruded branch 62e which has at its lower or leading end a curled portion 62f spaced apart from the lower surface section of the base 62a.

Figure 19:
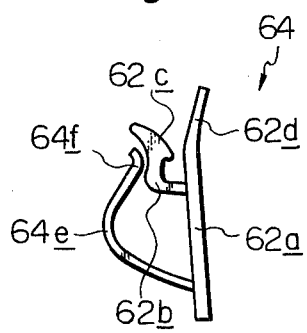
FIGS. 19 and 20 are respective side views of the other improved clip members each having similar construction to the clip member shown in FIGS. 18A and 18B.
Figure 20:
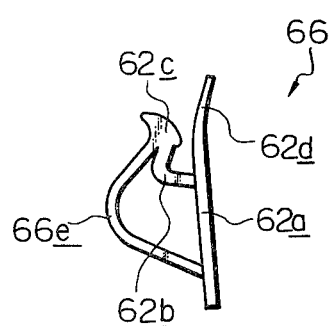

FIGS. 19 and 20 respectively shown other clip members 64 and 66 which are similar in construction to the above-described clip member 62. The same numerals will be used for the same parts as the clip member 62. The clip member 64 in FIG. 19 has an outwardly protruded branch 64e which extends from the lower section of the base 62a has at its leading or upper end a curled portion 64f spaced from the catch portion 62c. The clip member 66 of FIG. 20 has an outwardly protruded branch 66e which is integral at both ends with the lower section of the base 62a and the catch portion 62c.

Figure 21A:
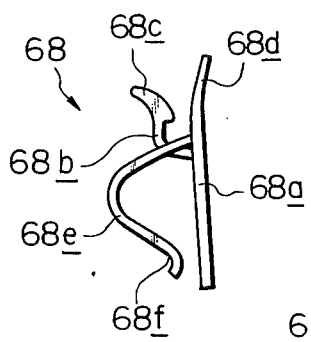
FIGS. 21A and 21B are respective side and perspective views of another improved clip member employable to the window assembly of the invention.
Figure 21B:
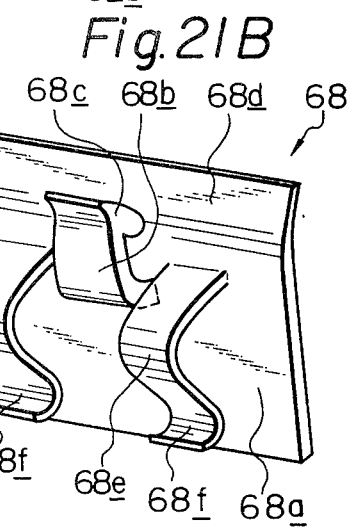

FIGS. 21A and 21B show another exemplary clip member 68 comprising a flat base 68a having a thin section 68d. Upwardly extending from a relatively upper section of the base portion 68a is a resilient leg 68b which is shorter than that of FIGS. 15 to 17 and is provided at its leading or upper end with a catch portion 68c. Downwardly extending from relatively upper sections of the base 68a while flanking the leg 68b therebetween are two outwardly protruded branches 68e each having at its leading or lower end a curled portion 68f spaced from the surface of the base 68a.

Figure 22:
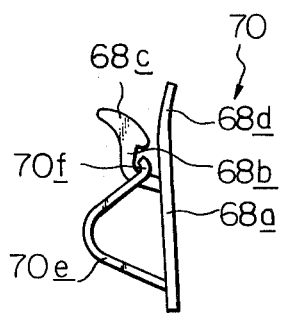
FIGS. 22 and 23 are respective side views of other improved clip members each having similar construction to the clip member shown in FIGS. 21A and 21B.
Figure 23:
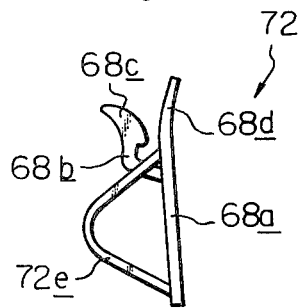

FIGS. 22 and 23 show respectively other exemplary clip members 70 and 72 which are similar to the above-stated clip member 68. The same parts will be designated by the same numerals as the case of FIG. 21A. The clip member 70 of FIG. 22 has two outwardly protruded branches 70e which extend from the lower sections of the base 68a and have respectively at their leading or upper ends curled portions 70f spaced from the surfaces of the base 68a. The clip member 72 in the case of FIG. 23 is formed to have two outwardly protruded branches 72e each of which is integral at its either ends with the base as shown.

As has been clearly explained before, the outwardly protruded branch with the curled portion functions to urge the base toward the first flat surface 16a of the frame structure 16 upon engagement with the edge of the glass panel 12, thereby preventing the clip member from been torn off during assembly with the decorative moulding strip 28.

From the above, it will be appreciated that the characteristic function of the improved clip member is assured so long as the clip member has therein at least one leg and at least one outwardly protruded branch formed in the described fashion.

It should be noted that the catch portion may be partially formed on the corresponding leading end of the leg, and the thin portion formed on the base of the clip member may be deleted if the bent end of the decorative moulding strip is equipped with a spacing member.

It should be also noted that the branch may take the other forms so long as it functions similarly to the above-described outwardly protruded branch.

It should be also noted that the branches shown in FIGS. 7, 13, 16, 19 and 22 may be so formed to have leading or upper ends which do not contact, upon functional operations thereof, with the base or catch portion so long as at least one part of each branch portion is resiliently engageable with the edge of the glass panel under such a condition.

From the above, it will be appreciated that the motor vehicle window assembly in accordance with the present invention can eliminate the before-mentioned drawbacks encountered in the prior art window assemblies such as shown in FIGS. 2 to 4.

It should be noted that various modifications and improvements are possible by those skilled in the art without departing from the scope of the present invention which is defined by the appended claims.

What is claimed is:

1. A motor vehicle window assembly including a frame structure having a surface portion defining an aperture, a fixed glass panel received in said aperture in a manner to define a certain space between an edge of said glass panel and said surface portion, a molding strip arranged around the periphery of said glass panel so as to conceal said space, and a clip member disposed in said space and connected to said frame structure for detachably holding said molding strip in place, said clip member comprising:

a base with first and second opposed ends, said base being bonded at a first side surface thereof to said surface portion of said frame structure in such a manner that the first end of said base faces toward said molding strip;

a leg integrally connected to a second side surface opposite said first side surface of said base and extending from said second side surface toward said molding strip, said leg having a free end spaced apart from said base at a predetermined distance, said free end comprising a catch portion which is engageable for detachably holding an edge of said molding strip; and at least one branch extending arcuately away from said base in a plane passing through said first and second base ends and extending toward said edge of said glass panel and being integrally connected at at least one connecting end to said clip member, the summit of the arcuate portion of said branch member protruding toward said edge of said glass panel to be contactable with said edge, and an end section of said branch being positioned to urge said second end of said base into firm contact with said surface portion in response to movement of the catch portion of said leg away from said base which produces a condition wherein the summit of said branch contacts said edge of said glass panel.

2. A motor vehicle window assembly as claimed in claim 1, in which said arcuate portion of said branch is located at generally the middle of same.

3. A motor vehicle window assembly as claimed in claim 1, in which said branch is connected to and extends from said leg.

4. A motor vehicle window assembly as claimed in claim 3, in which said branch has a free end which is spaced from a surface of said base under disengagement of said branch from the edge of said glass panel.

5. A motor vehicle window assembly as claimed in claim 4, in which said branch is extended from each of the lateral sides of a laterally extending arm portion which is integrally connected at the generally middle portion thereof to the free end of said leg.

6. A motor vehicle window assembly as claimed in claim 4, in which said branch is extended from each of the lateral sides of a laterally extending wall portion which constitutes a connected section of said leg with said base.

7. A motor vehicle window assembly as claimed in claim 4, in which said branch extends from a portion near said catch portion of said leg.

8. A motor vehicle window assembly as claimed in claim 3, in which said branch has both ends integrally connected to said leg thereby to form an enclosed space therebetween.

9. A motor vehicle window assembly as claimed in claim 3, in which said branch has both ends integrally connected to said base and said leg.

10. A motor vehicle window assembly as claimed in claim 9, in which said branch is extended from each of the lateral sides of an arm portion which is integral at the generally middle portion thereof with the free end of said leg.

11. A motor vehicle window assembly as claimed in claim 9, in which said branch is extended from each of the lateral sides of a laterally extending wall portion which constitutes a connected section of said leg with said base.

12. A motor vehicle window assembly as claimed in claim 9, in which said branch extends from a portion near said catch portion of said leg.

13. A motor vehicle window assembly as claimed in claim 3, wherein said end section of said branch is normally spaced from a surface of said leg when said curved section of said branch is disengaged from said edge of said glass panel.

14. A motor vehicle window assembly as claimed in claim 13, in which said branch extends from a portion near said catch portion of said leg and the free end section thereof is located in the vicinity of the connection of said leg with said base.

15. A motor vehicle window assembly as claimed in claim 14, in which said leg extends from said second end of said base.

16. A motor vehicle window assembly as claimed in claim 13, in which said branch extends from a portion near a connected section of said leg to locate said free end in the vicinity of said catch portion.

17. A motor vehicle window assembly as claimed in claim 1, in which said branch is extended from a portion of said base.

18. A motor vehicle window assembly as claimed in claim 17, in which said branch has a free end which is spaced from a surface of each of the lateral sides of a laterally extending arm portion which is integrally connected at the generally middle portion thereof to the free end of said leg.

19. A motor vehicle window assembly as claimed in claim 17, in which said branch has a free end which is spaced from a surface of each of the lateral sides of a laterally extending wall portion which constitutes a connected section of said leg with said base.

20. A motor vehicle window assembly as claimed in claim 17, in which said branch extends from each of two portions of said base which portions flank said leg therebetween.

21. A motor vehicle window assembly as claimed in claim 20, in which said branch has a free end which is spaced from a surface of said base under disengagement of said branch from the edge of said glass panel.

22. A motor vehicle window assembly as claimed in claim 20, in which said branch has a free end integrally connected to a portion of said base.

23. A motor vehicle window assembly as claimed in claim 1, in which said first end of said base is placed between a portion of said molding strip and said surface portion of said frame structure when said molding strip is engaged with said clip member.

24. A motor vehicle window assembly including a frame structure having a surface portion defining an aperture, a fixed glass panel received in said aperture in a manner to define a certain space between an edge of said glass panel and said surface portion, a molding strip arranged around the periphery of said glass panel so as to conceal said space, and a clip member disposed in said space and connected to said frame structure for detachably holding said molding strip in place, said clip member comprising:
- a base with first and second opposed ends, said base being bonded at a first side surface thereof to said surface portion of said frame structure in such a manner that the first end of said base faces toward said molding strip;
- a leg integrally connected to and extending from the second end of said base toward said molding strip, with the free end thereof spaced apart from said base at a predetermined distance, said free end including a catch portion which is engageable for detachably holding an edge of said molding strip; and
- a branch integrally connected to and arcuately extending from said leg in the vicinity of said catch portion of said leg, with the free end of said branch located in the vicinity of a connected section of said leg with said base, the summit of the arcuate section of said branch protruding toward said edge of said glass panel to be contactable with said edge, whereby said free end of said branch urges said connected section and thus said second end of said base into firm contact with said surface portion when the catch portion of said leg is urged away from said base under a condition wherein the summit of the arcuate section of said branch contacts said edge of said glass panel.

25. A motor vehicle window assembly having a fixed glass panel, comprising:
- a frame structure having a surface portion defining an aperture for receiving said glass panel, said surface portion being spaced from an edge of said glass panel at a predetermined distance;
- a clip member interposed between said edge of said glass panel and said surface portion, said clip member including a base having first and second opposed ends and being bonded to said surface portion, and a leg extending from a portion of said base toward the first end, and said leg including a catch portion at the free end thereof;
- means engageable with the edge of the glass panel for urging the second end of said base into firm contact with said surface portion when said leg is urged away from said base; and,
- a molding strip having one edge engageable with said catch portion to urge the leg away from said base, said urging means comprising a branch which is integral with said leg and extends from a portion near said catch portion of said leg and includes a free end thereof located in the vicinity of a connected section of said leg with said base, said branch having a generally middle portion thereof protruding toward the edge of said glass panel to be contactable with the same, said free end of said branch urging said connected section and thus said second end of said base into firm contact with said surface portion of said frame structure in response to movement of the catch portion of said leg away from said base which causes the generally middle portion of said branch to contact said edge of said glass panel.

* * * * *